(12) United States Patent  
Jalava

(10) Patent No.: US 8,995,807 B1  
(45) Date of Patent: Mar. 31, 2015

(54) LAMINATED LIGHT GUIDE COLLIMATOR

(71) Applicant: Modilis Holdings LLC, Wilmington, DE (US)

(72) Inventor: Juho Ilkka Jalava, Salo (FI)

(73) Assignee: Modilis Holdings LLC, Wilmington, DE (US)

(*) Notice: Subject to any disclaimer, the term of this patent is extended or adjusted under 35 U.S.C. 154(b) by 0 days.

(21) Appl. No.: 13/931,386

(22) Filed: Jun. 28, 2013

(51) Int. Cl.
*G02B 6/34* (2006.01)

(52) U.S. Cl.
CPC ............................... *G02B 6/34* (2013.01)
USPC .............................................. 385/37

(58) Field of Classification Search
CPC ............ G02B 6/29323; G02B 6/0036
See application file for complete search history.

(56) References Cited

U.S. PATENT DOCUMENTS

| | | | |
|---|---|---|---|
| 6,667,782 B1* | 12/2003 | Taira et al. | 349/65 |
| 8,659,221 B2* | 2/2014 | Jones et al. | 313/506 |
| 2008/0101088 A1* | 5/2008 | Kim et al. | 362/620 |
| 2011/0141765 A1* | 6/2011 | Chang et al. | 362/606 |

\* cited by examiner

*Primary Examiner* — Omar R Rojas

(74) *Attorney, Agent, or Firm* — Lee & Hayes, PLLC

(57) ABSTRACT

The subject matter disclosed herein relates to an optical device comprising: a light guide film to transport light rays via total internal reflection; a first optical layer covering at least a portion of a first side of the light guide film, the first optical layer to receive an exiting portion of the light rays; a second optical layer covering at least a portion of the first optical layer; and a grating pattern located at an interface between the first optical layer and the second optical layer to out-couple light rays travelling in the light guide film, wherein the grating pattern is configured so that the exiting portion of the light rays transmit through the grating pattern twice before being total internally reflected by the grating pattern.

20 Claims, 12 Drawing Sheets

LAMINATED LIGHT GUIDE COLLIMATOR

BACKGROUND

Modern electronic devices typically have user interfaces that include high-quality displays (e.g., color, greater than 300 ppi, and 800:1 contrast ratio). These electronic displays are found in numerous types of electronic devices such as include electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth. Electronic displays may present various types of information, such as user interfaces, device operational status, digital content items, and the like, depending on the kind and purpose of the associated device. The appearance and quality of a display can affect the user's experience with the electronic device and the content presented thereon. Accordingly, finding ways to enhance user experience and satisfaction continues to be a priority.

Increased multimedia use imposes high demands on designs of display modules, as content available for mobile use becomes visually richer. In a liquid-crystal display (LCD), energy efficiency, among other things, can be determined by a backlight or frontlight design. Many conventional transmissive electronic displays use backlights that light up a display to enable a viewer to see content on the display that can otherwise be difficult to see without the backlights. In another example, conventional reflective displays use frontlights to improve visibility of content on displays, particularly in low light situations.

Electronic devices configured with backlights and/or frontlights can incorporate one or more light guides to direct light from a light source onto or through a display. In some applications, a light source can have a relatively small area, such as in the case of a light emitting diode (LED).

BRIEF DESCRIPTION OF THE DRAWINGS

The detailed description is described with reference to non-limiting and non-exhaustive embodiments shown in the accompanying figures. The same reference numerals in different figures refer to similar or identical items.

DETAILED DESCRIPTION

Overview

Figure 1:
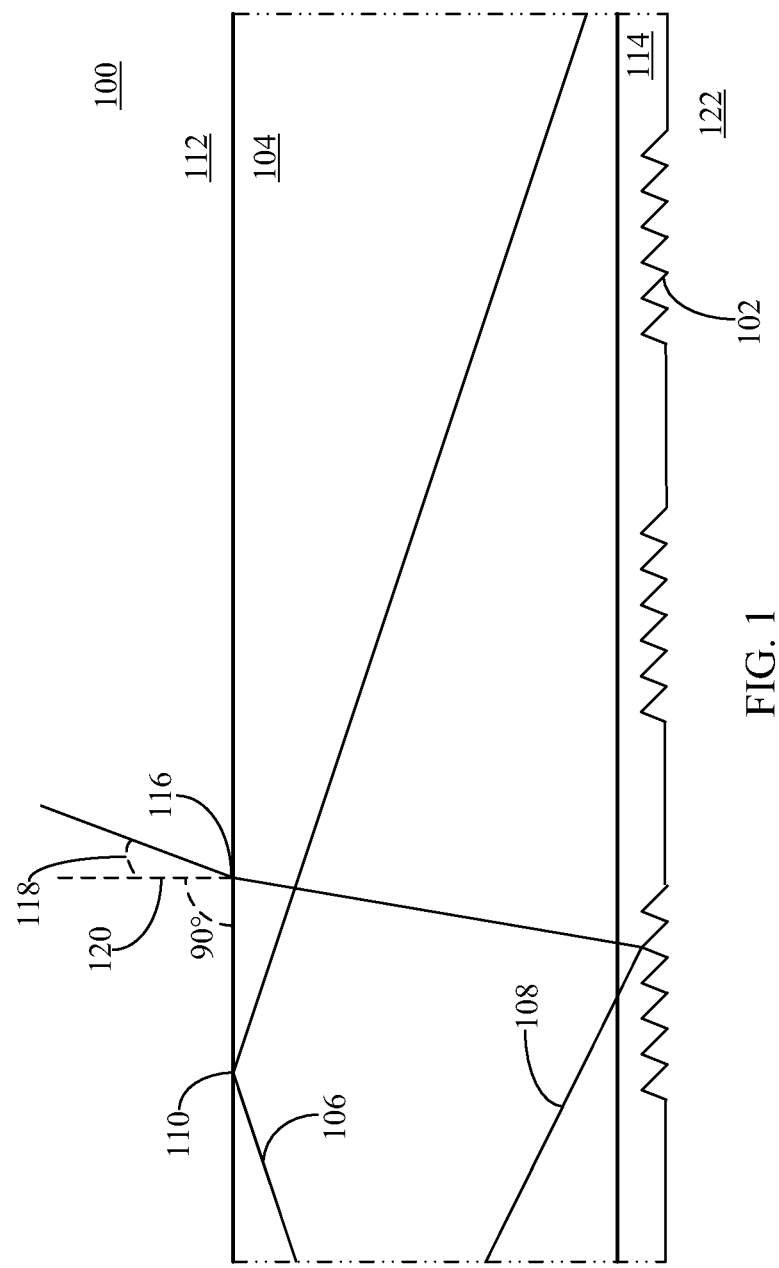
FIG. 1 is a cross-section of a light guide with a blazed grating, according to some embodiments.

This disclosure describes, in part, electronic devices that include displays for presenting content and other information. In some examples, the electronic device may also include one or more additional components associated with the display, such as a touch sensor component layered atop the display for detecting touch inputs, a front light or back light component for lighting the display, and/or a cover layer component, which may include antiglare properties, antireflective properties, anti-fingerprint properties, anti-cracking properties, and the like. This disclosure also includes techniques for assembling electronic devices including these component stacks for the displays and other features described herein.

In some examples, the display may include an outer layer or protective sheet applied during manufacture of the display. The protective sheet is a transparent sheet that overlies and protects an image-displaying component of the display such that the image-displaying component is viewable through the protective sheet. When assembling an electronic device, one or more additional components may be stacked on top of or otherwise coupled to the protective sheet to produce a display assembly of the electronic device. In some cases, the one or more additional components are coupled to the protective sheet by a liquid optically clear adhesive (LOCA) that adheres the additional component(s) to the protective sheet. The LOCA may be cured through photo initiation using ultraviolet (UV) light.

In various embodiments, an optical device, such as a laminated collimator, can distribute light from a small-area light source to a relatively large area of a display or other device as described herein. For example, a laminated collimator can distribute light from one or more light emitting diodes (LEDs) to regions of a display where the light can be used for illumination, such as backlighting or frontlighting for LCD-based displays.

In a number of implementations, a laminated collimator can distribute light uniformly across an area behind or in front of a pixelated display plane. In various implementations, a laminated collimator can allow for modulating or adjusting light output intensity over time for particular locations of an area behind or in front of a pixelated display plane. For example, changing the orientation (e.g., tilting) of a non-symmetric grating pattern (e.g., a blazed grating or a binary-type grating), can change the angle in which the pattern is oriented toward a light source. Accordingly, light intensity at a pixel can be modulated by turning the pixel. In another example, the density of a grating pattern can be changed to modulate or adjust light output intensity. Grating density refers to a ratio of area of grating pattern to an area of non-patterned surface. For example, pattern density of a grating can be low near a light source while pattern density of the grating can increase with increasing distance from the light source.

In at least one embodiment, a laminated collimator can include a light guide and one or more beam steering structures. For example, a light guide includes a light guide film and a composite optical coating laminated to the light guide film. The composite optical coating includes a first optical layer, a second optical layer, and a grating pattern. The first and second optical layers can be applied or deposited onto the light guide film by techniques other than lamination, and claimed subject matter is not limited in this respect. The first optical layer can cover at least a portion of a side of the light guide film. A side of the first optical layer opposite to the side of the first optical layer that forms an interface between the light guide film and the first optical layer can include the grating pattern. The second optical layer can cover at least a portion of the first optical layer and its grating pattern. In some implementations, a non-gas low-refractive index (LRI) boundary layer can at least partially cover the second optical layer. Accordingly, for proper operation, a laminated collimator as described herein need not be surrounded by air or other gas having an index of refraction near 1.0. Instead, a laminated collimator is operable in any medium, providing an advantage in that indices of refraction of materials contacting exterior portions of a laminated collimator need not be considered. In other words, materials contacting exterior portions of a laminated collimator need not affect its performance. A laminated collimator having this feature, among others, can be useful for some types of displays, such as displays incorporating some color e-inks and front-light LCD technologies, just to name a few examples.

A grating pattern in a first optical layer of a light guide can be configured to out-couple light rays travelling in a light guide film of the light guide. Out-coupling occurs while the light rays travel in the light guide film. Light rays travel in the light guide film with a distribution of angles. For example, some of the light rays can be outcoupled because of the presence of a composite optical coating. In order for light rays to be outcoupled or transmitted to outside of the film when they strikes the inside surface of the film, the outcoupled light rays have to be traveling in the light guide film within a particular range of angles; otherwise the light rays will internally reflect back into the light guide film. Herein, the term "out-couple" refers to the portion of light rays being directed out of the bounds of the light guide film from the light rays traveling in the light guide film. When light rays strike the grating pattern, the light rays can be diverted to outside the light guide film. Such diverted light rays can exit the light guide film at an angle that is undesirable for some applications. For example, frontlighting or backlighting display applications can operate with light that exits from a surface at or less than a relatively small angle (e.g., at least about 5 to at most about 10 degrees) from the normal to the surface. Thus, a laminated collimator can further include a beam steering structure covering at least a portion of the light guide film. Such a beam steering structure can bend light rays by any angle. Accordingly, excessively large angles of light rays exiting a light guide can be "corrected" to smaller angles when the light rays traverse a beam steering structure. Mathematically, a surface normal is a unit vector perpendicular (e.g., 90 degrees) to a surface. As used herein, a surface normal is used to provide a reference direction when discussing directions that light rays travel through optical materials or structures.

In some embodiments, a laminated collimator can provide a number of benefits. For example, a laminated collimator can allow for a higher degree of collimation compared to that of various blazed grating techniques (described below). Another benefit is that a laminated collimator can generate less than about half the amount of undesirable stray light that can be generated by various blazed gratings. Yet another benefit is that a laminated collimator can generate relatively low levels (e.g., less than about 5.0%) of back-scattered light compared to various blazed gratings. This feature can be particularly useful in applications that involve opposing light propagating directions with relatively low cross-talk. For example, patterns in a laminated collimator can affect light travelling from left to right along the laminated collimator, while the patterns need not affect light travelling from right to left. In particular, light rays travelling from right to left substantially preserve their propagation angles and stay within the laminated collimator while light rays travelling from left to right may be out-coupled out of the laminated collimator. Accordingly, a single laminated collimator can be used for multiple purposes at the same time. For example, the laminated collimator can simultaneously transfer IR signals from ambient sensors or use two light sources on opposite ends of a light guide and create isolated areas that are sensitive to only one of the two light sources. This makes it possible to change the appearance of an illuminated area by changing which light source is active. This could be used, for example, to create form-changing illuminated icons. These and other benefits can be important for any of a number of applications, such as backlighting or frontlighting for relatively large LCD-based displays, or displays that incorporate relatively thin optical foils or layers.

In some embodiments, a beam steering structure can include a number of layers. For example, a beam steering structure can include a surface film, a first patterned layer, and a second patterned layer. The second patterned layer can include a first beam-steering grating pattern at an interface between the first and the second patterned layers. The first beam-steering grating pattern and the second beam-steering grating pattern can be configured to steer light rays crossing the light guide toward a normal of the surface film. A plurality of beam steering structures (e.g., a beam steering stack) can be layered to cumulatively affect an angle of a traversing light ray. In particular, the first beam-steering grating pattern is configured so that light rays that cross the light guide film transmit through the first beam-steering grating pattern once before being total internally reflected by the first beam-steering grating pattern. The second beam-steering grating pattern is configured so that light rays reflected from the first beam-steering grating pattern transmit through the second beam-steering grating pattern exactly once so as to change a direction of travel of the transmitted light rays.

In some embodiments, an optical device that includes structures described herein can be incorporated in a display. Such a display can comprise a portion of a system that includes one or more processors and one or more computer memories. A display module can be stored on the one or more memories and can be operable on the one or more processors to modulate light rays that are out-coupled from a light guide of the optical device.

In some embodiments, a light guide film, first and second optical layers, an LRI boundary layer, and components of a beam steering structure can include any of a number of types of glass or plastic materials, which can be selected based, at least in part, on their respective indices of refraction.

Light discussed in embodiments need not be limited to the visible portion of the spectrum. Instead, light can include electromagnetic radiation in any portion of the spectrum, including ultra-violet, visible, and infrared.

Illustrative Environment

FIG. 1 is a cross-section of a light guide 100 incorporating a blazed grating 102 and a light guide film 104, according to some embodiments. A few example light rays 106 and 108 are shown. Light can travel within a light guide film 104 via total internal reflection (TIR). For example, light ray 106 internally reflects at a point 110 of an interface between light guide film 104 and a surrounding medium 112, such as air. Light ray 106 can experience subsequent reflections via TIR and thus stay within the confines of light guide film 104. On the other hand, some light rays, such as light ray 108, can enter an optical coating 114, strike blazed grating 102, and consequently be directed outside light guide film 104 and into surrounding medium 112. Such light rays can exit the light guide film at angles that are relatively small, even after refraction at an exit point 116. Exit angles 118 can be measured relative to a normal axis 120 perpendicular to the exit surface (e.g., the surface of light guide film 104). Light rays exiting light guide film 104 at angles substantially close to the normal axis can be a desirable feature of light guide 100 for illumination applications involving LCD displays. However, light guide 100 can have an undesirable feature: In order to operate properly, material 122 of light guide 100 must be air or other gas having a refraction index near 1.0.

In some implementations, structures (e.g., films, layers, coatings) of light guide film 100 can include any of a number of types of transparent materials, such as polymethyl methacrylate (PMMA), polycarbonate (PC), polyethylene, polyethylene terephthalate, polyvinyl butyral, transparent ceramics, various glasses, and so on. For example, blazed grating 102 can include a micro structure fabricated by any of a number of techniques, such as hot embossing, injection molding, or with a lacquer layer on foil, just to name a few examples.

Figure 2:
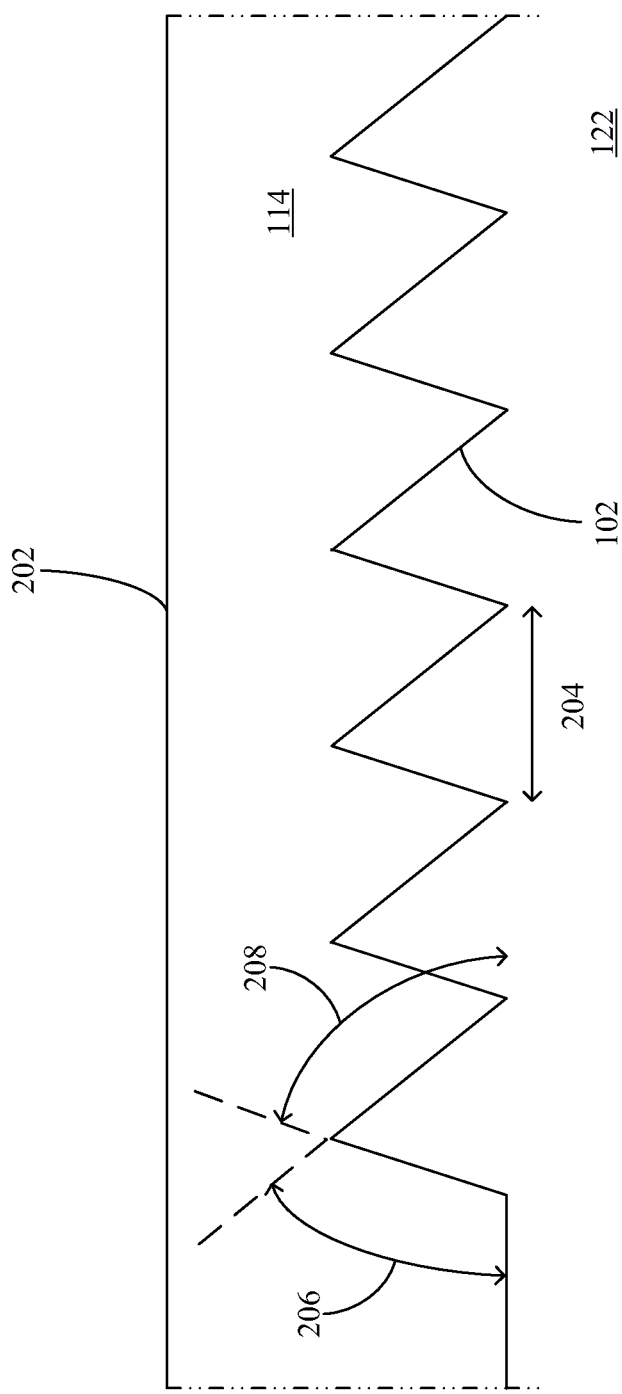
FIG. 2 is a close-up view of a blazed grating, according to some embodiments.

FIG. 2 is a close-up view of blazed grating 102 of light guide 100. A first side of optical coating 114 includes grating 102 and an opposite side 202 includes an interface between the optical coating and light guide film 104. Grating 102, as shown, has a line spacing 204 and a triangular, sawtooth-shaped cross section, forming a step structure. Blaze angles 206 and 208 can be adjusted to maximize diffraction efficiency for a particular wavelength of light. For a particular numerical example, angle 206 can be about 88.0 degrees and angle 208 can be about 43.5 degrees.

A properly operating light guide 100 provides light rays exiting within a few degrees of normal to the light guide. Such exiting light rays can be used for illumination applications involving LCD displays. As mentioned above, however, for proper operation, blazed grating 102 of light guide 100 cannot be optically coupled to any materials other than air or other low-index materials (e.g., indices of refraction substantially near 1.0). For example, if surrounding medium 122 includes an optical coating having an index of refraction of about 1.3 then blazed grating 102 will not properly diffract light. Blazed grating 102 operates by bending light rays using more than one grating element. For example, a single grating (one triangular pattern) will produce weakly collimated light. On the other hand, multiple grating elements close to one another work together to change the direction of propagating light. However, the angle of light can to a point where the light no longer travels through additional grating elements but is reflected at angles close to surface normal by TIR. However, light bending (by TIR) that yields reflected light close to surface normal cannot occur in a medium having a certain range of refractive indices, such as 1.3 or above.

Figure 3:
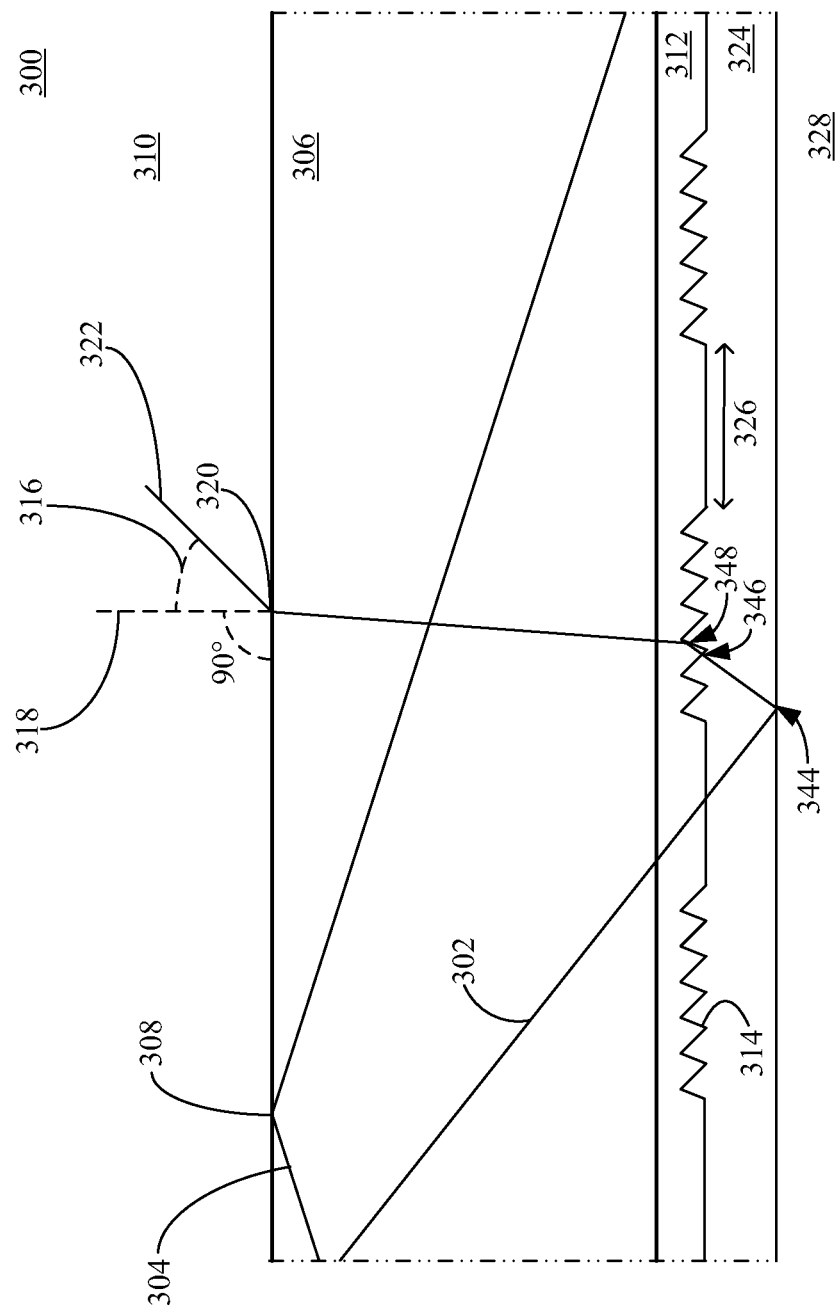
FIG. 3 is a cross-section of a light guide, according to various embodiments.

FIG. 3 is a cross-section of a light guide 300, according to some embodiments. Two example light rays 302 and 304 are shown. Light can travel within light guide film 306 via TIR. For example, light ray 304 internally reflects at a point 308 of an interface between light guide film 306 and a surrounding medium 310, which can include air. Light ray 304 can experience subsequent reflections via TIR and can thus stay within the confines of light guide film 306. On the other hand, some light rays, such as light ray 302, exit light guide film 306 by propagating through a first optical layer 312 and into a second optical layer 324. The first optical layer 312, the second optical layer 324, and a grating pattern 314 comprise a composite optical coating that covers at least a portion of light guide film 306. Grating pattern 314 is configured to out-couple light rays travelling in the light guide film. For example, the grating pattern is configured so that light rays that exit light guide film 306 transmit through grating pattern 314 twice before being total internally reflected by the grating pattern at an angle that out-couples the exiting light rays. As indicated by 344, light ray 302 then reflects, via TIR, off an interface between second optical layer 324 and a non-gas low-refractive index (LRI) boundary layer 328. The reflected light ray strikes a first portion 346 of grating pattern 314 that, via refraction, redirects the light ray toward a second portion 348 of grating pattern 314. Based, at least in part, on the difference of refractive indices of first and second optical layers 312 and 314 and an angle at which the light ray is refracted from first portion 346, grating pattern 314 reflects, via TIR, the light ray into light guide film 306. The light ray crosses the light guide film 306 in a final pass at a sufficiently small angle (relative to a normal axis 318) that allows the light ray to exit light guide film 306 and enter surrounding medium 310. Though grating pattern 314 can direct such exiting light rays at angles 316 that are sufficiently small to allow the light rays to exit light guide film 306, these angles are relatively large (e.g., greater than about 10.0 degrees) compared to angles of exiting light rays produced by a blazed grating, such as that shown in the example embodiment of FIG. 1. Refraction at exit point 320 can further increase the exiting angle. Light ray 322 exiting light guide film 306 at such relatively large angles can be undesirable for some illumination applications involving LCD displays. Accordingly, as explained below, a beam steering structure placed on light guide film 306 can steer exiting beams toward the normal axis.

Second optical layer 324, at least partially covering first optical layer 312, can have an index of refraction substantially less than an index of refraction of layer 312. As used herein, an index of refraction of one material is "substantially different" than that of another material if the refractive indices differ by about 5% or more; for example, the refractive indices may differ by 5.1%, 5.5%, 6.5%. Thus, an index of refraction of a first material is "substantially less" than that of a second material if the refractive index of the first material is about 5%, or more, lower than the refractive index of the second material. For example, an index of refraction of layer 324 can be about 1.49, and an index of refraction of layer 312 can be about 1.59. In some implementations non-gas LRI boundary layer 328 can at least partially cover the second optical layer 324.

In various implementations, a density of grating pattern 314 can be determined by an inter-pattern spacing 326. A distribution or uniformity of light exiting light guide 300 can be based, at least in part, on such a grating pattern density. Though example light ray 302 is shown in FIG. 3 to cross the first-second optical layer interface in an inter-pattern spacing 326, a light ray crossing this interface in the grating pattern 314 can still experience a first TIR, refraction, and a second TIR, such as experienced by light ray 302 at 344, 346, and 348, respectively.

In some implementations, light guide 300 can include one or more passive optical layers between, among, above or below light guide film 306, surrounding medium 310, first optical layer 312, second optical layer 324 and LRI boundary layer 328. An optical layer is considered passive if the optical layer does not affect the angle of travel of a light ray. For example, any homogeneous layer of material having a constant thickness can behave as a passive layer (e.g., a layer of glass or plastic). This is because light that bends (refracts) by a particular angle upon entering the passive layer will unbend by the same angle upon exiting the passive layer, resulting in a net direction change of zero. More particularly, light refraction angles are not substantially affected (e.g., refractive angle changes of less than 2.0 degrees) by the presence of a passive optical layer, except within the optical layer itself. For example, if light exits at a particular exit angle from a stack of optical layers, adding a passive layer anywhere into the stack will not change the exit angle. As another example, one or more passive optical layers (not shown) between or among light guide film 306, surrounding medium 310, first optical layer 312, second optical layer 324 and/or LRI boundary layer 328 would not affect trajectory angles of light ray 302 at 344, 346, 348 or 320. There are a number of reasons why an optical stack may include a passive layer. For example, a passive layer can add physical strength to an optical stack. In another example, a passive layer can be a by-product (e.g., relic) of a process that fabricates an optical stack. In yet another example, a passive layer can be used as a physical spacer to acquire a particular thickness of a portion of an optical stack.

In some embodiments, the refractive index of light guide film 306 may be substantially the same (e.g., within 2%) as that of first optical layer 312. Accordingly, the optical interface between light guide film 306 and first optical layer 312 is optically passive. In such a case, trajectory angles of light ray 302 at 344, 346, 348 or 320 would be the same whether grating pattern 314 is at the interface between first optical layer 312 and second optical layer 324 (e.g., as shown in FIG. film layer 3), or is at the interface between light guide film 306 and second optical layer 324—without including the first optical layer 312 between optical layers 306 and 324.

Figure 4:
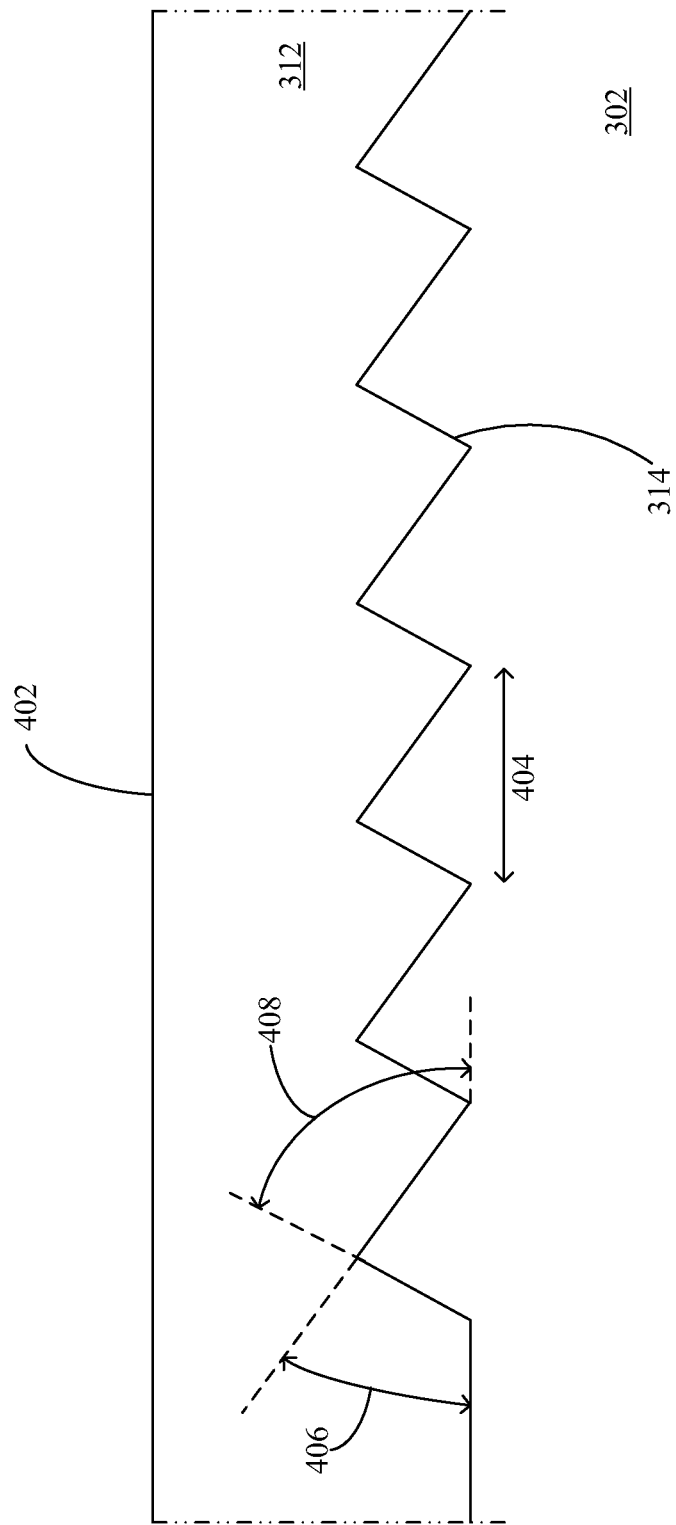
FIG. 4 is a close-up view of a grating pattern of a light guide, according to several embodiments.

FIG. 4 is a close-up view of grating pattern 314 of light guide 300, according to some embodiments. A side of second optical layer 312 includes grating pattern 314 and an opposite side 402 includes an interface between the second optical layer and light guide film 306. First optical layer 324 at least partially covers the grating pattern. Grating pattern 314, as shown, has a line spacing 404 and a triangular, sawtooth-shaped cross section, forming a step structure. Pattern angles 406 and 408 can be adjusted to maximize refraction efficiency for a particular wavelength of light.

For a particular numerical example, angle 406 can be about 72.69 degrees and angle 408 can be about 31.69 degrees. Though such example angles are provided with a particular accuracy (e.g., to the nearest hundredth of a degree), angles need not be so precise. Moreover, pattern angles 406 and/or 408 can be changed to compensate for different refractive indices. In various implementations, some parameters of grating pattern 314, such as line spacing 404 and pattern angles 406 and 408, can be selected based, at least in part, on display size, light source (e.g., LEDs) type, light source positions, and so on.

Grating pattern 314 can include a micro structure fabricated by any of a number of techniques, such as hot embossing, injection molding, or with a lacquer layer on foil, just to name a few examples. Examples of such optical lacquer can include, for example, an optical lacquer such as Nalax3®, manufactured by Nanocomp Oy Ltd. of Lehmo, Finland, optical lacquers manufactured by SKC of Seoul, Korea, or other optical lacquers.

Figure 5:
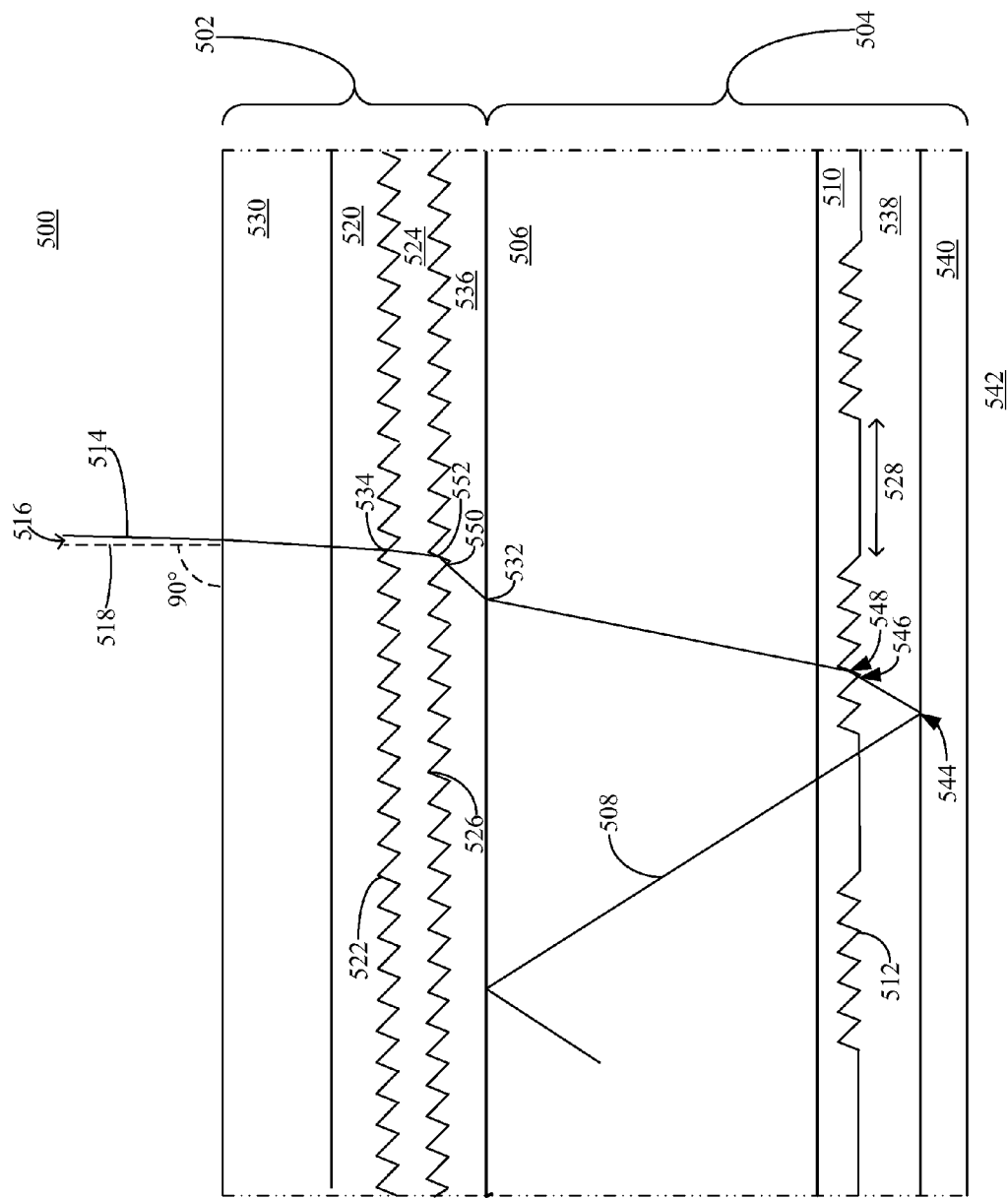
FIG. 5 is a cross-section of a light guide with a beam steering structure, according to various embodiments.

FIG. 5 is a cross-section of a laminated collimator 500 including a beam steering structure 502 and a light guide 504. As mentioned above, light rays exiting a light guide at relatively large angles can be undesirable for any of a number of applications, such as illumination applications involving LCD displays. Accordingly, beam steering structure 502 can be placed on light guide 504 to steer exiting beams toward the normal axis of the light guide.

As described above, light can travel within a light guide film 506 via TIR. A portion of light rays, such as 508, can transmit through a first optical layer 510 and into a second optical layer 538. Grating pattern 512 in the first optical layer can be configured to out-couple light rays travelling in the light guide film. The first optical layer 510, the second optical layer 538, and grating pattern 512 comprise a composite optical coating that covers at least a portion of light guide film 506. Grating pattern 512 is configured to out-couple light rays travelling in the light guide film. For example, the grating pattern is configured so that light rays that exit light guide film 506 transmit through grating pattern 512 twice before being total internally reflected by the grating pattern at an angle that out-couples the exiting light rays.

As indicated by 544, light ray 508 reflects, via TIR, off an interface between second optical layer 538 and a non-gas low-refractive index (LRI) boundary layer 540. The reflected light ray strikes a first portion 546 of grating pattern 512 that, via refraction, redirects the light ray toward a second portion 548 of grating pattern 512. Based, at least in part, on the difference of refractive indices of first and second optical layers 510 and 538 and an angle at which the light ray is refracted from first portion 546, grating pattern 512 reflects, via TIR, the light ray into light guide film 506. The light ray crosses the light guide in a final pass at a sufficiently small angle (relative to an axis normal to surface of 506) that allows the light ray to exit light guide film 506 and enter a beam steering structure 502.

Though grating pattern 512 can direct light rays at angles that are sufficiently small to allow the light rays to exit light guide 504, these angles are undesirably large (e.g., greater than about 10.0 degrees) for a number of applications involving LCD displays. Refraction at exit point 532 can further increase the exiting angle. Beam steering structure 502 placed on light guide 504, however, can steer exiting beams toward the normal axis. For example, beam steering structure 502 can bend light ray 508 exiting light guide 504 so that the light ray (as light ray 514) exits laminated collimator 500 at an angle 516 that is relatively small (e.g., less than about 5 degrees), measured relative to normal axis 518 perpendicular to the exit surface (e.g., the surface of beam steering structure 502). Such light rays exiting a collimator at angles substantially close to the normal axis 518 can be a desirable feature for a number of applications, including illumination applications involving LCD displays.

In detail, beam steering structure 502 includes transmissive elements, including a number of patterned layers. For example, a first patterned layer 520 includes a first pattern 522 and a second patterned layer 524 includes a second pattern 526. First and second patterns can be continuous, or, like grating pattern 512 one or both can include an inter-pattern spacing similar to 528. First and second patterns need not affect distribution of light exiting laminated collimator 500. Beam steering structure 502 can also include a surface film 530 at least partially covering first patterned layer 520.

Light ray 508 refracts as it exits light guide film 506 and enters beam steering structure 502 at point 532. The refracted light ray strikes a first portion 550 of grating pattern 526 that, via refraction, redirects the light ray toward a second portion 552 of grating pattern 526. Based, at least in part, on the difference of refractive indices of second patterned layers 524 and an LRI interface layer 536 and an angle at which the light ray is refracted from first portion 550, grating pattern 526 reflects, via TIR, the light ray toward first pattern 522.

By refraction, the first pattern 522 bends the light ray as the light ray transits first pattern 522 at point 534. The interface between first patterned layer 520 and surface film 530 and the exit surface of surface film 530 further bend the light ray toward axis 518 via refraction.

In some embodiments, beam steering structure 502 can be optically coupled to light guide 506 via LRI interface layer 536. Light guide 504 can further include second optical layer 538 and an LRI boundary layer 540. Optical coupling can be performed by laminating beam steering structure 502 to light guide 504 using LRI interface layer 536 as an adhesive. In an implementation, LRI interface layer 536 and LRI boundary layer 540 can include the same material. In one example, such a material can include an optically clear adhesive (OCA) silicone.

In some implementations, structures (e.g., films, layers, coatings) of laminated collimator 500 can include any of a number of types of transparent materials, such as polymethyl methacrylate (PMMA), polycarbonate (PC), polyethylene, polyethylene terephthalate, polyvinyl butyral, transparent ceramics, various glasses, and so on. Fabrication processes include thin film vapor deposition, printing, etching, and so on.

Herein, "optically coupled" can be used to refer to two or more portions comprising layers or an assembly of layers that are mutually arranged so that light in one portion can travel into another portion. For example, an optical layer can be optically coupled to a light guide film when the optical layer and the light guide film physically contact one another. In another related example, an optical layer can be optically coupled to a light guide film when the optical layer and the light guide film are physically separated from each other by a relatively small gap. Even though, in this case, transfer of light from the optical layer to the light guide film can be less efficient compared to the case where the optical layer and the light guide film are in contact with each other, the optical layer and the light guide film are nevertheless optically coupled to one another.

In some embodiments, a light guide film, first and second patterned layers (e.g., of a beam steering structure), first and second optical layers (e.g., of a laminated collimator), and LRI layers include any of a number of transparent glass or plastic materials, such as silicone OCA, lacquer, PET, PMMA, or PC, just to name a few examples. While selecting particular materials for the light guide and the various optical or patterned layers, indices of refraction of the materials can be considered. For example, a light guide film can include polycarbonate or other plastic. First and second optical layers and first and second patterned layers can include optical lacquers. For example, in some implementations, first patterned layer 520 can include a same material as that of first optical layer 510. Also, second patterned layer 524 can include a same material as that of second optical layer 538.

Such materials can satisfy criteria for desirable operation of a laminated collimator. For example, an index of refraction of second optical layer 538 can be substantially less than an index of refraction of the light guide film. Also, an index of refraction of first optical layer 510 can be substantially the same as the refractive index of the light guide film and substantially greater than the second optical layer 538. Also, an index of refraction of the LRI boundary layer can be substantially less than refractive indices of the light guide film, the first optical layer, and the second optical layer.

As mentioned above, a laminated collimator need not be surrounded by air, for example, for proper operation. Instead, a laminated collimator can operate in any medium 542, which can provide an advantage in that an index of refraction of 542 need not be considered for proper operation of laminated collimator 500.

In some implementations, laminated collimator 500 can include one or more passive optical layers between, among, above or below light guide film 506, first optical layer 510, second optical layer 538, LRI boundary layer 540, second patterned layer 524, surface film 530, first patterned layer 520 and LRI interface layer 536. For example, one or more passive optical layers (not shown) between or among these layers or films would not affect trajectory angles of light ray 508 at 544, 546, 548, 532, 550, 552 or 534.

In some embodiments, the refractive index of light guide film 506 may be substantially the same (e.g., within 2%) as that of first optical layer 510. Accordingly, the optical interface between light guide film 506 and first optical layer 510 is optically passive. In such a case, trajectory angles of light ray 508 at 544, 546, 548, 532, 550, 552 or 534 would be the same whether grating pattern 512 is at the interface between first optical layer 510 and second optical layer 538 (e.g., as shown in FIG. 5), or is at the interface between light guide film 506 and second optical layer 538—without including the first optical layer 510 between optical layers 506 and 538.

Figure 6:
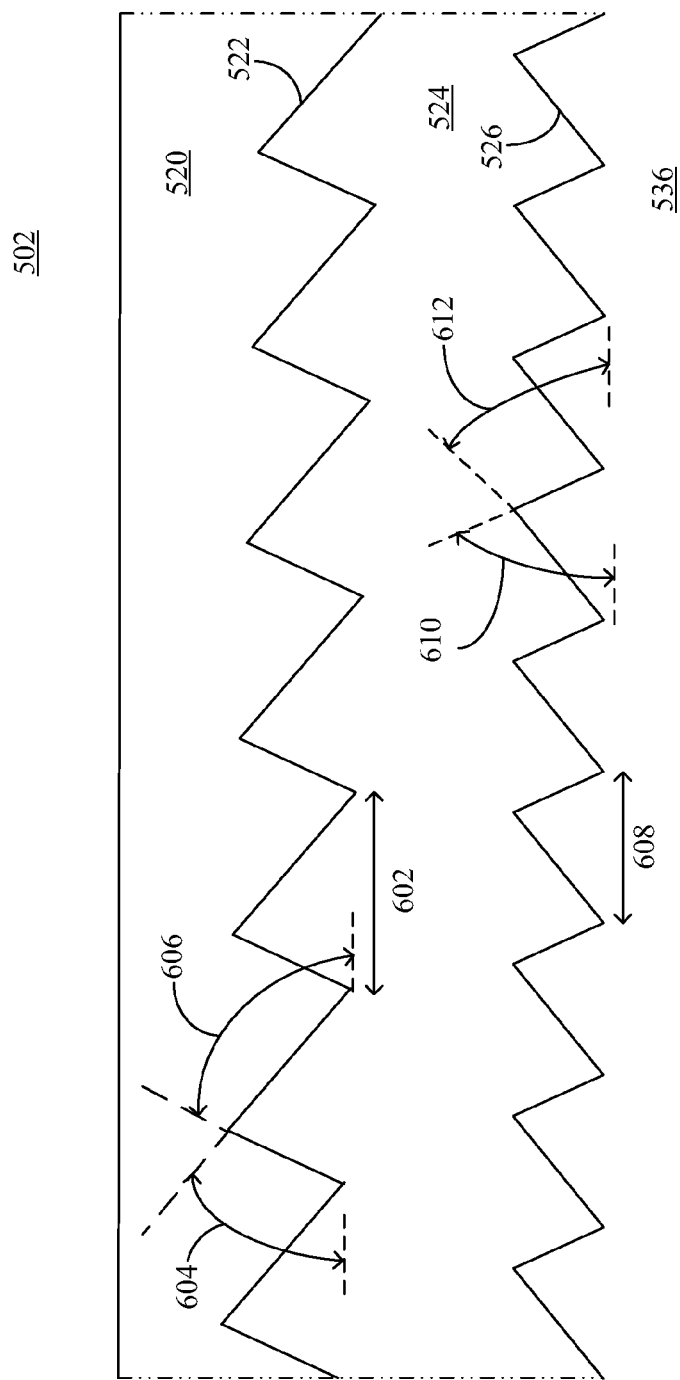
FIG. 6 is a close-up view of grating patterns of a beam steering structure, according to some embodiments.

FIG. 6 is a close-up view of grating patterns of beam steering structure 502, according to some embodiments. First patterned layer 520 can include a first pattern 522 and second patterned layer 524 can include a second pattern 526. First pattern 522, as shown, has a line spacing 602, a triangular, sawtooth-shaped cross section, and pattern angles 604 and 606. For a particular numerical example, angle 604 can be about 53.43 degrees and angle 606 can be about 84.77 degrees. Second pattern 526, as shown, has a line spacing 608, a triangular, sawtooth-shaped cross section, and pattern angles 610 and 612. For a particular numerical example, angle 610 can be about 88.84 degrees and angle 612 can be about 58.25 degrees.

Line spacing and pattern angles of the first and second patterns can be adjusted or selected based, at least in part, on display size, light source (e.g., LEDs) type, light source positions, and so on. Positions or phases of first pattern 522 and second pattern 526 need not be synchronously positioned with one another. Accordingly, fabrication of beam steering structure 502 can thus be relatively simple. In some implementations, second pattern 526 can be at least partially covered by LRI interface layer 536.

First and second patterns can include a micro structure fabricated by any of a number of techniques, such as hot embossing, injection molding, or with a lacquer layer on foil, just to name a few examples.

Figure 7A:
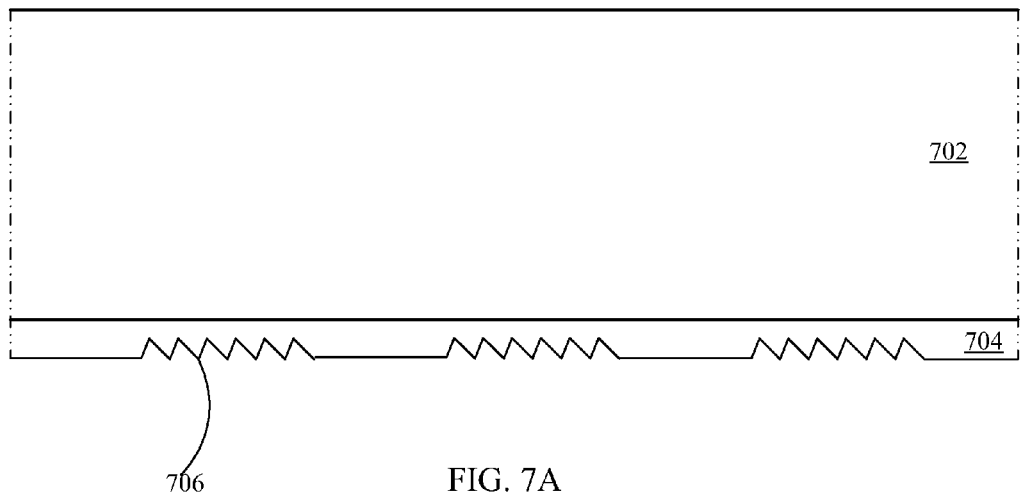
FIGS. 7A-7E show a process of fabricating a light guide and beam steering structure, according to various embodiments.

FIGS. 7A-7E show a process of fabricating a laminated collimator by forming a light guide and a beam steering structure. Such a process can begin by at least partially covering a light guide film 702 with a first optical layer 704, as shown in FIG. 7A. For example, optical layer 704 can be a lacquer including a grating pattern 706. In some embodiments, a grating can be manufactured by a roll-to-roll (R2R) method, involving applying liquid lacquer on plastic foil to produce a form, and then transferring the form via drum tool to a lacquer film. Lacquer can simultaneously harden, for example, by exposure to UV light. The drum tool or a belt can have a negative pattern that has been manufactured from a master by electroforming. For example, a master can be fabricated using e-beam, laser lithography, or mechanical grinding processes.

Figure 7B:
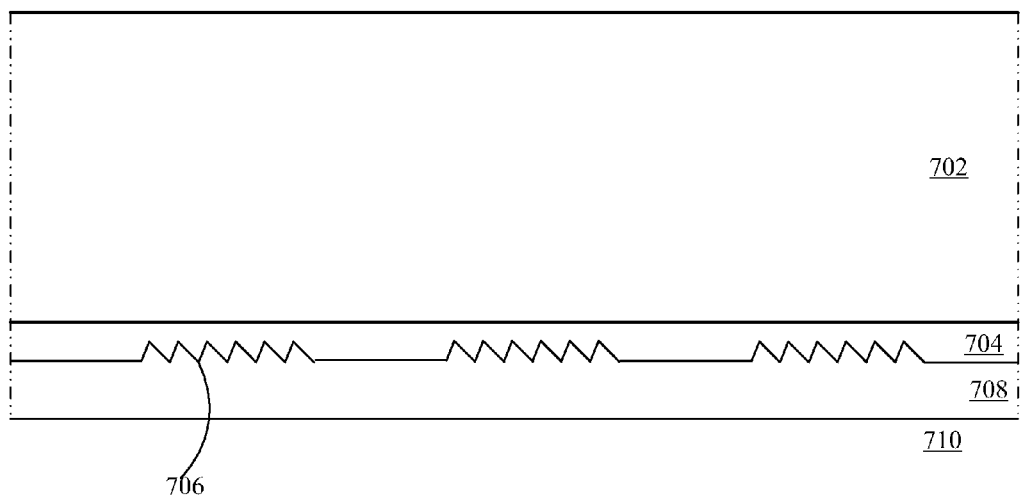

In FIG. 7B, a second optical layer 708 is applied to first optical layer 704 so as to cover grating pattern 706. With an addition of an optional LRI boundary layer 710 covering second optical layer 708, a resulting structure can include a light guide 724 as shown in FIG. 7E.

Figure 7C:
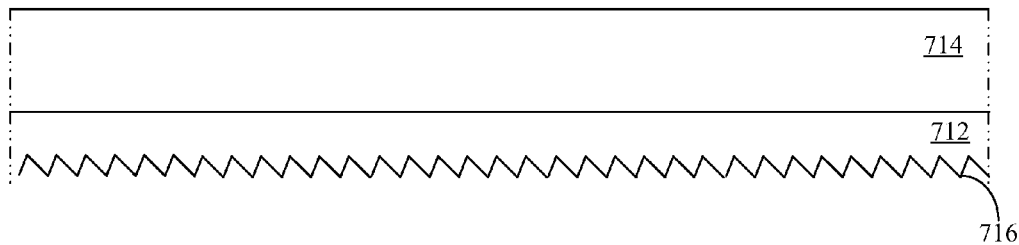
Figure 7D:
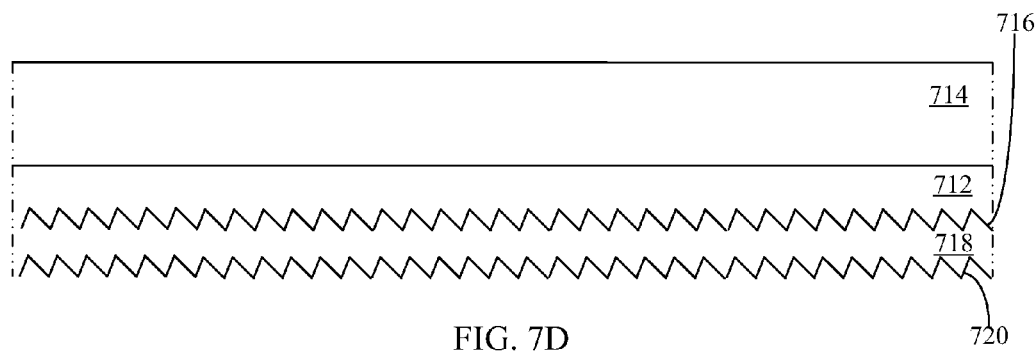

In FIG. 7C, fabricating a beam steering structure can begin by applying a first patterned layer 712 to a surface layer 714. First patterned layer 712 includes a first pattern 716. In FIG. 7D, a second patterned layer 718 can be applied to first patterned layer 712. Second patterned layer 718 includes a second pattern 720. A resulting structure includes a beam steering structure 726 as shown in FIG. 7E.

Figure 7E:
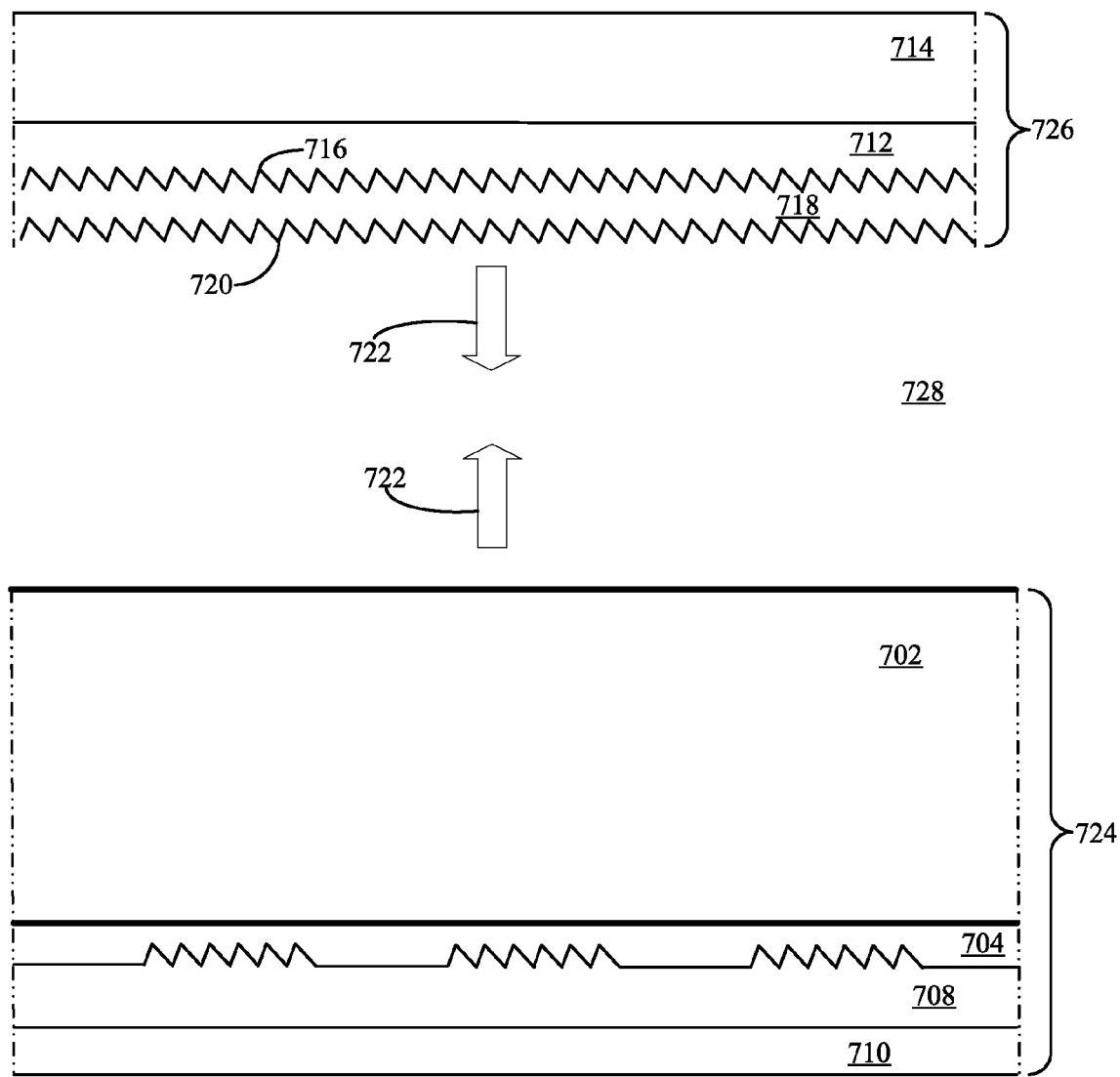

Arrows 722 in FIG. 7E indicate that light guide 724 and beam steering structure 726 can be brought together so as to be optically coupled to one another. An interstitial space between the laminated collimator and the beam steering structure can be filled with LRI material 728 to form an LRI interface layer. In some implementations, LRI material 728 can be an optical adhesive, which can bond light guide 724 and beam steering structure 726 together to form a laminated collimator, such as laminated collimator 500 shown in the example embodiment of FIG. 5.

Figure 8A:
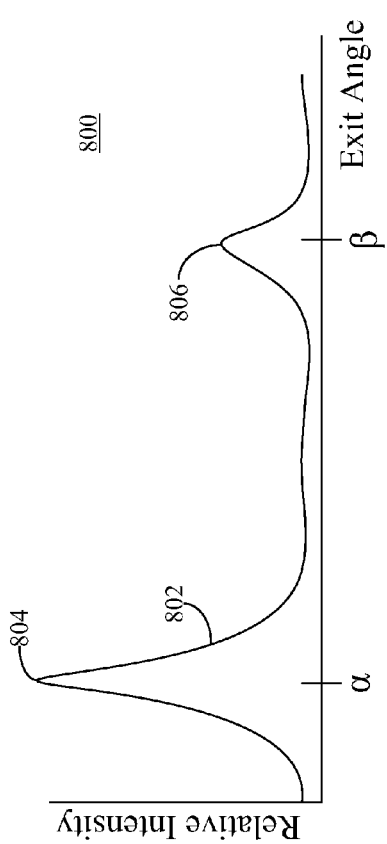
FIG. 8A is a plot of distribution of light exiting a laminated collimator, according to some embodiments.

FIG. 8A is a plot 800 for describing a distribution of light exiting a laminated collimator, according to various embodiments. In particular, line 802 can include a plot of relative intensity of light exiting an optical surface as a function of exit angle. As described above, an exit angle can include an angle of exiting light measured from an axis normal to the exit surface. For example, returning to FIG. 5, angle 516 of light exiting beam steering structure 502 can include an exit angle plotted along the horizontal axis of plot 800.

In this particular example embodiment, line 802 includes a primary peak 804 at an exit angle α and a secondary peak 806 at an exit angle β. Primary peak 804 corresponds to a distribution of relatively small exit angles for light exiting a beam steering structure of a laminated collimator. As mentioned above, such small angles can be desirable for a number of applications. For example, angle α can be about 5 to 10 degrees.

Secondary peak 806 corresponds to a distribution of relatively large exit angles for light exiting the beam steering structure of the laminated collimator. Exit angle β can be about 50 to 60 degrees, though claimed subject matter is not limited to any particular angles. Light in such a secondary peak corresponds to stray light propagating through a laminated collimator. In some implementations, a second patterned layer (e.g., 524, shown in FIG. 5) of a beam steering structure can, at least in part, direct stray light to exit angles of a secondary peak.

Figure 8B:
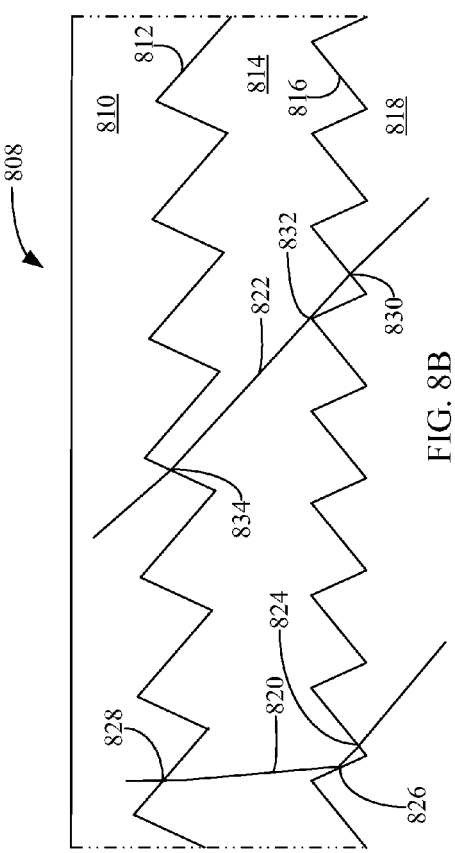
FIG. 8B is a close-up view of grating patterns of a portion of a beam steering structure, according to various embodiments.

FIG. 8B is a close-up view of grating patterns of a portion of a beam steering structure 808, according to various embodiments. First patterned layer 810 can include a first pattern 812 and second patterned layer 814 can include a second pattern 816. An LRI interface layer 818 at least partially covers second patterned layer 814. Two example light rays 820 and 822 are shown interacting with first and second patterned layers in FIG. 8. In particular, light ray 820 crosses portion 824 of second pattern 816 and refracts toward portion 826 that in turn reflects, via TIR, light ray 820 toward a portion 828 of first pattern 812. Portion 828 of first pattern 812 subsequently refracts light ray 820 toward an exit angle that falls in an angular range of primary peak 804, shown in FIG. 8A. In contrast, light ray 822 follows a path toward an exit angle that falls in an angular range of secondary peak 806. In particular, light ray 822 crosses portion 830 of second pattern 816 and refracts toward an upper portion 832 of second pattern 816. However, light ray 822 is refracted in such a direction so as to miss striking upper portion 832. Instead, light ray 822 proceeds, without reflecting from any portion of second pattern 816, toward a portion 834 of first pattern 812. The lack of reflection from second pattern 816 leads to first pattern 812 subsequently refracting light ray 822 toward an exit angle that falls in an angular range of secondary peak 806, shown in FIG. 8A.

As described below, an amount of light exiting at a secondary distribution of peak angles can be reduced by incorporating more than one beam steering structure (e.g., a beam steering stack) on a laminated collimator.

Figure 9:
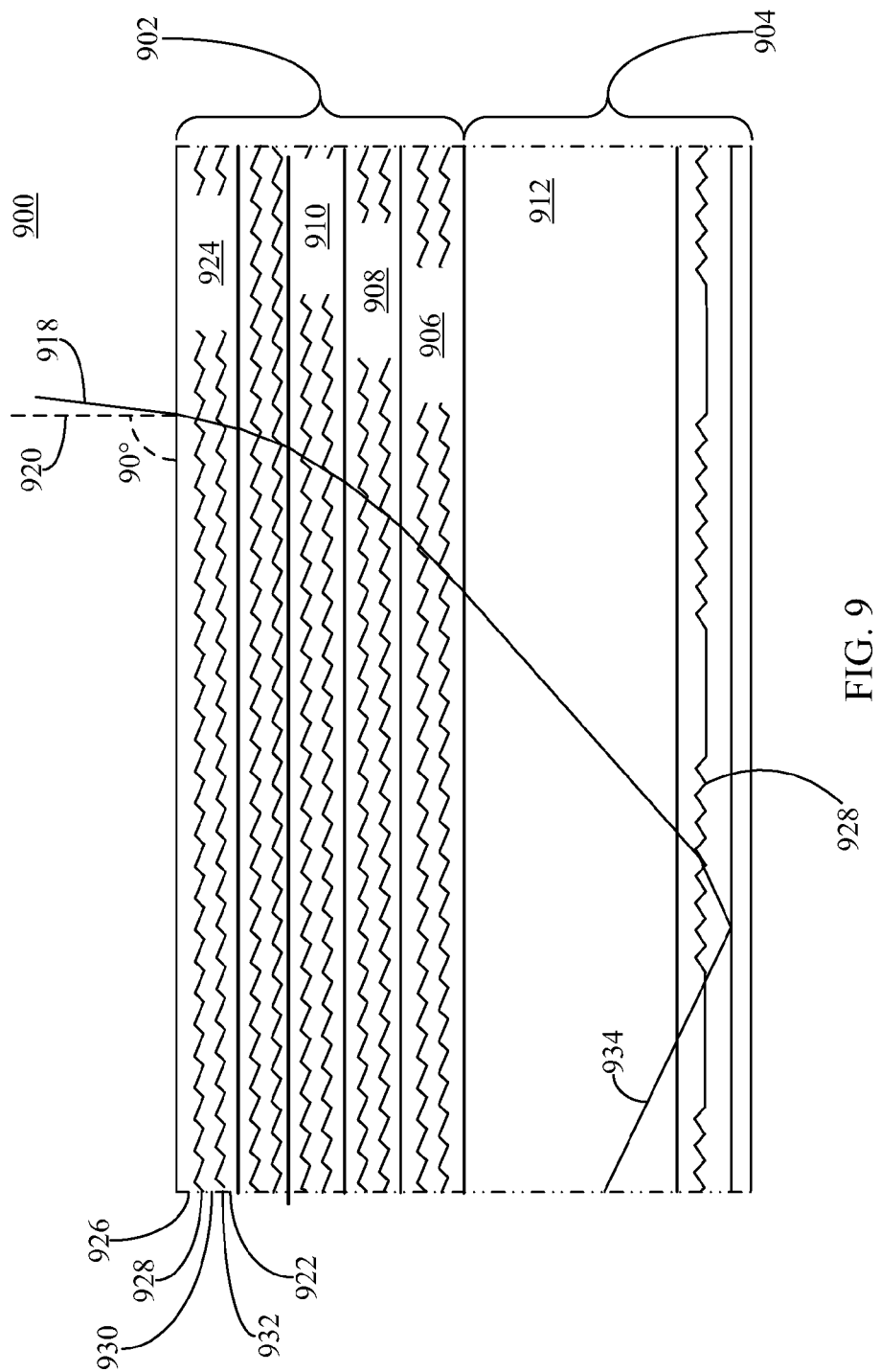
FIG. 9 is a laminated collimator including a beam steering stack, according to some embodiments.

FIG. 9 is a laminated collimator 900 including a beam steering stack 902 and a light guide 904, according to some embodiments. As mentioned above, a beam steering structure can be combined with a light guide to steer exiting beams toward a normal axis of the light guide. An example embodiment of such a case is shown in FIG. 5. In the embodiment of FIG. 9, beam steering stack 902 comprising multiple beam steering structures 906, 908, 910, and so on, can be placed on light guide 904 to further steer exiting beams toward the normal axis of the light guide. In other words, light-bending features of beam steering structures can be cumulative. For example, if one beam steering structure bends a light ray by 2 degrees, then two such beam steering structures can bend the same light ray by 4 degrees. Patterned layers of such beam steering structures, however, can be used to steer light by other angles, and an amount of light bending may be different for different beam steering structures.

A principle of operation of a beam steering structure is based, at least in part, on the fact that a light ray refracts (e.g., is bent) in a boundary between two materials having different refractive indices, except when the light ray perpendicularly hits the boundary. In this special case, the light ray preserves its angle while passing through the boundary. From a collimation point of view that desires an exit angle close to the normal of an exit surface, a flat boundary without a pattern can improve the ray angle when the light ray passes from low refractive index material to high refractive index material, regardless of the incident angle. On the other hand, when light is passing a boundary from high refractive index material to low refractive index material the gained benefit in ray angle is lost.

First patterned layer 926, first pattern 928, second patterned layer 930, and second pattern 932 can be designed so that a light ray is refracted (e.g., bent) at portions of a boundary that is flat, without a pattern, while passing from low refractive index material to high refractive index material. Once the light ray passes from high refractive index material to low refractive index material it sees a patterned portion of a boundary where pattern orientation is such that the light ray hits a face of the patterned portion perpendicularly. In this way, the gained light ray bending by the flat portion of the pattern can be preserved while the light ray passes through high refractive index material to low refractive index material.

As described above, light can travel within a light guide film 912 via TIR. A portion of light rays, such as 934, can strike a grating pattern 928 and consequently be directed outside light guide film 912 and into first beam steering structure 906, which can bend the light ray by a particular angle. The light ray subsequently travels into second beam steering structure 908, which can additionally bend the light ray by a particular angle. The light ray again travels into another beam steering structure 910, which can additionally bend the light ray, and so on. Accordingly, a resulting light ray 918 can exit the laminated collimator at angles that are relatively small, measured relative to a normal axis 920 perpendicular to the exit surface (e.g., the surface of beam steering stack 902). On the other hand, a beam steering stack can bend light in any direction, including directions having angles that are large (e.g., within a few degrees of parallel to the exit surface).

Small exit angles or large exit angles, for example, can be desirable for different applications. In some implementations, direction of beam steering and/or number of beam steering structures in a beam steering stack can be based, at least in part, on differences between refraction indices of patterned layers 914 and 908 of individual beam steering structures.

As described above, beam steering stack 902 can include individual beam steering structures (e.g., 906, 908, and so on) including a number of patterned layers and a surface film 922. For example, individual beam steering structure 924 can include first patterned layer 926 having a first pattern 928 and second patterned layer 930 having a second pattern 932. First patterned layer 926 and second patterned layer 930 can have an index of refraction different from one another. For example, first patterned layer 926 can have an index of refraction of about 1.59 while second patterned layer 930 can have an index of refraction of about 1.49, though indices of refraction of patterned layers can be any value, and claimed subject matter is not limited in this respect. Accordingly, beam steering of light (e.g., ray 934) can occur via refraction based on a difference of refraction indices of first and second patterned layers 926 and 930. Patterns 928 and 932 can further contribute to beam steering by preserving such refraction.

Figure 10:
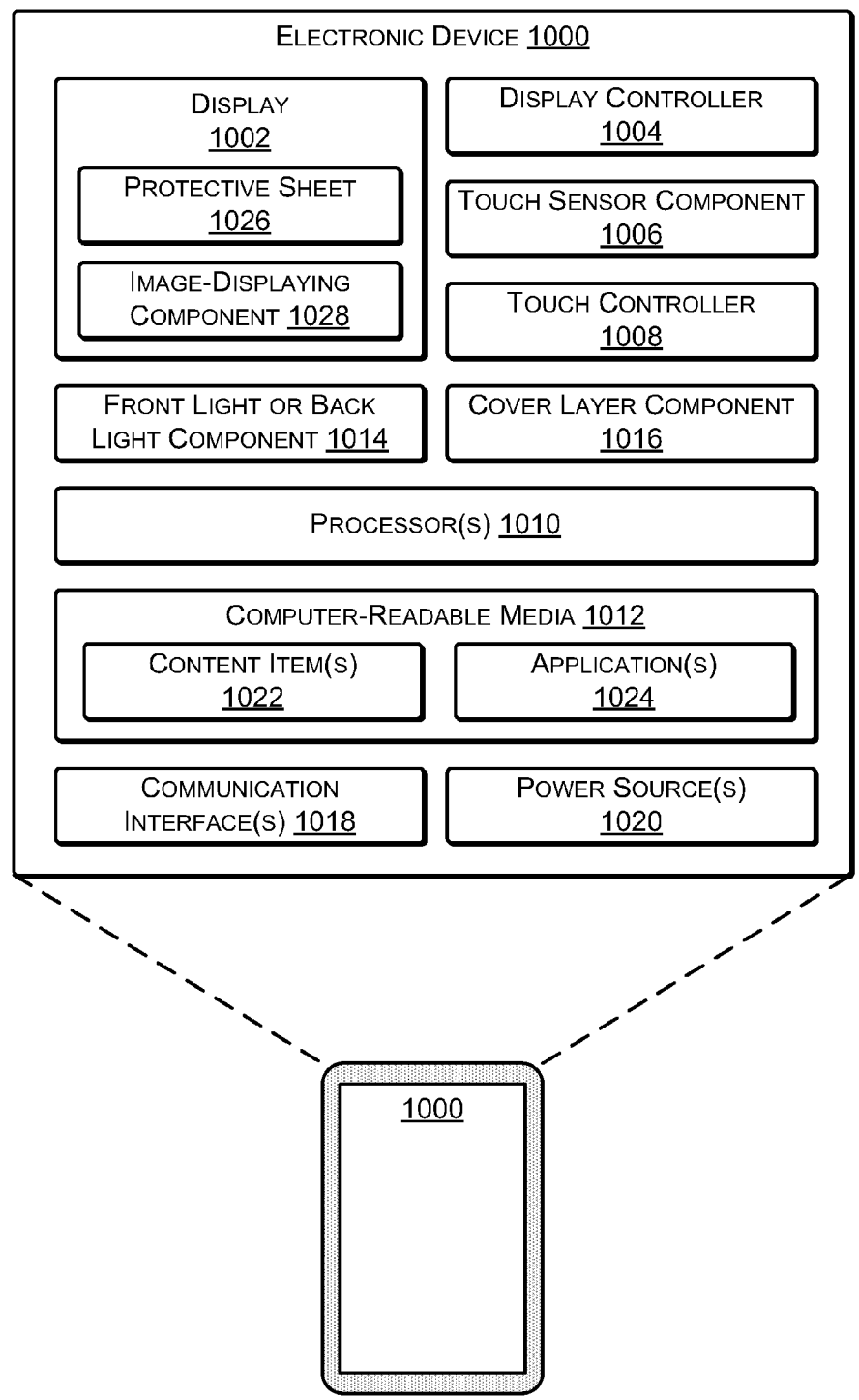
FIG. 10 illustrates an example electronic device equipped with a light guide, according to some embodiments.

FIG. 10 illustrates an example electronic device 1000 that may include the example display assemblies discussed above. The device 1000 may comprise any type of electronic device having a display. For instance, the device 1000 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 1000 may be a non-mobile electronic device (e.g., a computer display, a television, etc.). In addition, while FIG. 10 illustrates several example components of the electronic device 1000, it is to be appreciated that the device 1000 may also include other conventional components, such as an operating system, system busses, input/output components, and the like. Further, in other examples, such as in the case of a television or computer monitor, the electronic device 100 may only include a subset of the components shown.

Regardless of the specific implementation of the electronic device 1000, the device 1000 includes a display 1002 and a corresponding display controller 1004. The display 1002 may represent a reflective display in some instances, such as an electronic paper display, a reflective LCD display, or the like. Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display. Some examples of the display 1002 that may be used with the implementations described herein include bi-stable LCD displays, micro electromechanical system (MEMS) displays, such as interferometric modulator displays, cholesteric displays, electrophoretic displays, electrofluidic pixel displays, electrowetting displays, photonic ink displays, gyricon displays, and the like. In other implementations, or for other types of devices 1000, the display 1002 may be an active display such as a liquid crystal display, a plasma display, a light emitting diode display, an organic light emitting diode display, and so forth. Accordingly, implementations herein are not limited to any particular display technology.

In one implementation, the display 1002 comprises an electrophoretic display that moves particles between different positions to achieve different color shades. For instance, in a pixel that is free from a color filter, the pixel may be configured to produce white when the particles within this pixel are located at the front (i.e., viewing) side of the display. When situated in this manner, the particles reflect incident light, thus giving the appearance of a white pixel. Conversely, when the particles are pushed near the rear of the display, the display absorbs the incident light and, hence, causes the pixel to appear black to a viewing user. In addition, the particles may situate at varying locations between the front and rear sides of the display to produce varying shades of gray. Furthermore, as used herein, a "white" pixel may comprise any shade of white or off white, while a "black" pixel may similarly comprise any shade of black.

In another implementation, the display 1002 comprises an electrophoretic display that includes oppositely charged light and dark particles. In order to create white, the display controller moves the light particles to the front side of the display by creating a corresponding charge at an electrode near the front and moves the dark particles to the back of the display by creating a corresponding charge at an electrode near the back. In order to create black, meanwhile, the controller changes the polarities and moves the dark particles to the front and the light particles to the back. Furthermore, to create varying shades of gray, the controller 1004 may utilize different arrays of both light and dark particles. In some cases, the particles may be contained in tiny individual transparent capsules, such as approximately 40 micrometers in diameter. The capsules are suspended in a fluid, such as a liquid polymer, between a transparent upper electrode grid layer and a lower electrode grid layer separated by a gap, such as approximately 50-200 micrometers.

In still another implementation, the display comprises an electrowetting display that employs an applied voltage to change the surface tension of a liquid in relation to a surface. For instance, by applying a voltage to a hydrophobic surface, the wetting properties of the surface can be modified so that the surface becomes increasingly hydrophilic. As one example of an electrowetting display, the modification of the surface tension acts as an optical switch by contracting a colored oil film when a voltage is applied to individual pixels of the display. When the voltage is absent, the colored oil forms a continuous film within a pixel, and the color may thus be visible to a user of the display. On the other hand, when the voltage is applied to the pixel, the colored oil is displaced and the pixel becomes transparent. When multiple pixels of the display are independently activated, the display can present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content. In addition, the lower power consumption of electrowetting displays in comparison to conventional LCD displays makes the technology suitable for displaying content on portable devices that rely on battery power.

Of course, while several different examples have been given, it is to be appreciated that the reflective displays described herein may comprise any other type of electronic-paper technology or reflective-display technology, examples of which are provided above. In addition, while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, the display 102 may represent a backlit display, examples of which are mentioned above.

In addition to including the display 1002, FIG. 10 illustrates that some examples of the device 1000 may include a touch sensor component 1006 and a touch controller 1008. In some instances, at least one touch sensor component 1006 resides with, or is stacked on, the display 1002 to form a touch-sensitive display (e.g., an electronic paper touch-sensitive display). Thus, the display 1002 may be capable of both accepting user touch input and rendering content in response to or corresponding to the touch input. As several examples, the touch sensor component 1006 may comprise a capacitive touch sensor, a force sensitive resistance (FSR), an interpolating force sensitive resistance (IFSR) sensor, or any other type of touch sensor. In some instances, the touch sensor component 1006 is capable of detecting touches as well as determining an amount of pressure or force of these touches.

FIG. 10 further illustrates that the electronic device 1000 may include one or more processors 1010 and one or more computer-readable media 1012, as well as a front light component 1014 (which may alternatively be a backlight component in the case of a backlit display) for lighting the display 1002, a cover layer component 1016, such as a cover glass or cover sheet, one or more communication interfaces 1018 and one or more power sources 1020. The communication interfaces 1018 may support both wired and wireless connection to various networks, such as cellular networks, radio, WiFi networks, short range networks (e.g., Bluetooth®), infrared (IR), and so forth.

Depending on the configuration of the electronic device 1000, the computer-readable media 1012 (and other computer-readable media described throughout) is an example of computer storage media and may include volatile and nonvolatile memory. Thus, the computer-readable media 1012 may include, but is not limited to, RAM, ROM, EEPROM, flash memory, or other memory technology, or any other medium that can be used to store computer-readable instructions, programs, applications, media items, and/or data which can be accessed by the electronic device 1000.

The computer-readable media 1012 may be used to store any number of functional components that are executable on the processor 1010, as well content items 1022 and applications 1024. Thus, the computer-readable media 1012 may include an operating system and a storage database to store one or more content items 1022, such as eBooks, audio books, songs, videos, still images, and the like. The computer-readable media 1012 of the electronic device 1000 may also store one or more content presentation applications to render content items on the device 1000. These content presentation applications may be implemented as various applications 1024 depending upon the content items 1022. For instance, the content presentation application may be an electronic book reader application for rending textual electronic books, an audio player for playing audio books or songs, a video player for playing video, and so forth.

In some instances, the electronic device 1000 may couple to a cover (not shown in FIG. 10) to protect the display (and other components in the display stack or display assembly) of the device 1000. In one example, the cover may include a back flap that covers a back portion of the device 1000 and a front flap that covers the display 1002 and the other components in the stack. The device 1000 and/or the cover may include a sensor (e.g., a hall effect sensor) to detect when the cover is open (i.e., when the front flap is not atop the display and other components). The sensor may send a signal to the front light component 1014 when the cover is open and, in response, the front light component 1014 may illuminate the display 1002. When the cover is closed, meanwhile, the front light component 1014 may receive a signal indicating that the cover has closed and, in response, the front light component 1014 may turn off.

Furthermore, the amount of light emitted by the front light component 1014 may vary. For instance, upon a user opening the cover, the light from the front light may gradually increase to its full illumination. In some instances, the device 1000 includes an ambient light sensor (not shown in FIG. 1) and the amount of illumination of the front light component 1014 may be based at least in part on the amount of ambient light detected by the ambient light sensor. For example, the front light component 1014 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of the display 1002 may vary depending on whether the front light component 1014 is on or off, or based on the amount of light provided by the front light component 1014. For instance, the electronic device 1000 may implement a larger default font or a greater contrast when the light is off compared to when the light is on. In some instances, the electronic device 1000 maintains, when the light is on, a contrast ratio for the display that is within a certain defined percentage of the contrast ratio when the light is off.

As described above, the touch sensor component 1006 may comprise a capacitive touch sensor that resides atop the display 1002. In some examples, the touch sensor component 1006 may be formed on or integrated with the cover layer component 1016. In other examples, the touch sensor component 1006 may be a separate component in the stack of the display assembly. The front light component 1014 may reside atop or below the touch sensor component 1006. In some instances, either the touch sensor component 1006 or the front light component 1014 is coupled to a top surface of a protective sheet 1026 of the display 1002. As one example, the front light component 1014 may include a lightguide sheet and a light source (not shown in FIG. 10). The lightguide sheet may comprise a substrate (e.g., a transparent thermoplastic such as PMMA or other acrylic), a layer of lacquer and multiple grating elements formed in the layer of lacquer that function to propagate light from the light source towards the display 1002, thus illuminating the display 1002.

The cover layer component 1016 may include a transparent substrate or sheet having an outer layer that functions to reduce at least one of glare or reflection of ambient light incident on the electronic device 1000. In some instances, the cover layer component 1016 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3 h pencil). Without such scratch resistance, a device may be more easily scratched and a user may perceive the scratches from the light that is dispersed over the top of the reflective display. In some examples, the protective sheet 1026 may include a similar UV-cured hard coating on the outer surface. The cover layer component 1016 may couple to another component or to the protective sheet 1026 of the display 1002. The cover layer component 1016 may, in some instances, also include a UV filter, a UV-absorbing dye, or the like, for protecting components lower in the stack from UV light incident on the electronic device 1000. In still other examples, the cover layer component 1016 may include a sheet of high-strength glass having an antiglare and/or antireflective coating.

The display 1002 includes the protective sheet 1026 overlying an image-displaying component 1028. For example, the display 1002 may be preassembled to have the protective sheet 1026 as an outer surface on the upper or image-viewing side of the display 1002. Accordingly, the protective sheet 1026 may be integral with and may overlie the image-displaying component 1028. The protective sheet 1026 may be optically transparent to enable a user to view, through the protective sheet 1026, an image presented on the image-displaying component 1028 of the display 1002.

In some examples, the protective sheet 1026 may be a transparent polymer film in the range of 25 to 200 micrometers in thickness. As several examples, the protective sheet may be a transparent polyester, such as polyethylene terephthalate (PET) or polyethylene naphthalate (PEN), or other suitable transparent polymer film or sheet, such as a polycarbonate or an acrylic. In some examples, the outer surface of the protective sheet 126 may include a coating, such as the hard coating described above. For instance, the hard coating may be applied to the outer surface of the protective sheet 1026 before or after assembly of the protective sheet 1026 with the image-displaying component 1028 of the display 1002. In some examples, the hard coating may include a photoinitiator or other reactive species in its composition, such as for curing the hard coating on the protective sheet 1026. Furthermore, in some examples, the protective sheet 1026 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by the protective sheet 1026, thereby protecting the image-displaying component 1028 from UV light.

According to some implementations herein, one or more of the components discussed above may be coupled to the display 1002 using a liquid optically clear adhesive (LOCA). For example, suppose that the light guide portion of the front light component 1014 is to be coupled to the display 1002. The light guide may be coupled to the display 1002 by placing the LOCA on the outer or upper surface of the protective sheet 1026. When the LOCA reaches the corner(s) and/or at least a portion of the perimeter of protective sheet, UV-curing may be performed on the LOCA at the corners and/or the portion of the perimeter. Thereafter, the remaining LOCA may be UV-cured and the front light component 1014 may be coupled to the LOCA. By first curing the corner(s) and/or perimeter, the techniques effectively create a barrier for the remaining LOCA and also prevent the formation of air gaps in the LOCA layer, thereby increasing the efficacy of the front light component 1014. In other implementations, the LOCA may be placed near a center of the protective sheet 1026, and pressed outwards towards a perimeter of the top surface of the protective sheet 126 by placing the front light component 1014 on top of the LOCA. The LOCA may then be cured by directing UV light through the front light component 1014. As discussed above, and as discussed additionally below, various techniques, such as surface treatment of the protective sheet, may be used to prevent discoloration of the LOCA and/or the protective sheet 1026.

While FIG. 10 illustrates a few example components, the electronic device 1000 may have additional features or functionality. For example, the device 1000 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 1000 may reside remotely from the device 1000 in some implementations. In these implementations, the device 1000 may utilize the communication interfaces 1018 to communicate with and utilize this functionality.

One skilled in the art will realize that a virtually unlimited number of variations to the above descriptions is possible, and that the examples and the accompanying figures are merely to illustrate one or more particular implementations.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, apparatuses, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. A device comprising:
   a light guide film to transport light rays via total internal reflection; and
   a composite optical coating to out-couple light rays travelling in the light guide film, wherein the composite optical coating covers at least a portion of a first side of the light guide film, and wherein the composite optical coating comprises:
      a first optical layer adjacent to the light guide film to receive an exiting portion of the light rays;
      a second optical layer covering at least a portion of the first optical layer; and
      a grating pattern located at an interface between the first and the second optical layers, wherein the grating pattern is configured so that the exiting portion of the light rays transmit through the grating pattern at least twice before being total internally reflected by the grating pattern at an angle that out-couples the exiting portion of the light rays.

2. The device of claim 1, wherein the out-coupled exiting portion of the light rays cross the light guide film after being total internally reflected by the grating pattern.

3. The device of claim 1, further comprising a non-gas, low-refractive index (LRI) boundary layer at least partially covering the second optical layer, wherein a refractive index of the LRI boundary layer comprises a value that allows the exiting portion of the light rays to total internally reflect from an interface between the second optical layer and the LRI boundary layer.

4. The device of claim 3, wherein a refractive index of the second optical layer is less than a refractive index of the first optical layer, and wherein the refractive index of the LRI boundary layer is less than refractive indices of the light guide film, the first optical layer, and the second optical layer.

5. The device of claim 2, further comprising:
   a beam steering structure covering at least a portion of a second side of the light guide film, wherein the second side is opposite to the first side, and wherein the beam steering structure comprises:
      a first beam-steering grating pattern configured so that the light rays that cross the light guide film transmit through the first beam-steering grating pattern at least once before being total internally reflected by the beam-steering grating pattern; and
      a second beam-steering grating pattern configured so that the light rays reflected from the first beam-steering grating pattern transmit through the second beam-steering grating pattern exactly once so as to change a direction of travel of the light rays.

6. A device comprising:
   a light guide film to transport light rays via total internal reflection;
   a first optical layer covering at least a portion of a first side of the light guide film, the first optical layer to receive a portion of the light rays exiting the light guide film as an exiting portion of the light rays;
   a second optical layer covering at least a portion of the first optical layer; and
   a grating pattern located at an interface between the first optical layer and the second optical layer to out-couple light rays travelling in the light guide film, wherein the grating pattern is configured so that the exiting portion of the light rays transmit through the grating pattern at least twice before being total internally reflected by the grating pattern.

7. The device of claim 6, wherein the total internal reflection by the grating pattern out-couples the exiting portion of the light rays from the device.

8. The device of claim 7, wherein the out-coupled exiting portion of the light rays cross the light guide film exactly once.

9. The device of claim 6, further comprising a non-gas, low-refractive index (LRI) boundary layer at least partially covering the second optical layer, wherein a refractive index of the LRI boundary layer comprises a value that allows the exiting portion of the light rays to total internally reflect from an interface between the second optical layer and the LRI boundary layer.

10. The device of claim 9, wherein a refractive index of the second optical layer is less than a refractive index of the first optical layer, and wherein the refractive index of the LRI boundary layer is less than refractive indices of the light guide film, the first optical layer, and the second optical layer.

11. The device of claim 6, further comprising:
   a beam steering structure covering at least a portion of a second side of the light guide film, wherein the second side is opposite to the first side, and wherein the beam steering structure comprises:
      a first beam-steering grating pattern configured so that the out-coupled exiting portion of the light rays transmit through the first beam-steering grating pattern at least once before being total internally reflected by the first beam-steering grating pattern; and
      a second beam-steering grating pattern configured so that the light rays reflected from the first beam-steering grating pattern transmit through the second beam-steering grating pattern exactly once so as to change a direction of travel of the light rays.

12. The device of claim 11, wherein the first beam-steering grating pattern and the second beam-steering grating pattern are configured to steer the out-coupled exiting portion of the light rays toward a direction normal to the beam steering structure.

13. The device of claim 11, further comprising one or more additional beam steering structures covering at least a portion of the beam steering structure.

14. The device of claim 11, further comprising: one or more passive optical layers between any of the first optical layer, the second optical layer, the light guide film, or the beam steering structure.

15. The device of claim 6 further comprising:
   one or more processors;
   one or more computer memories; and
   a display module stored on the one or more memories and operable on the one or more processors to modulate the out-coupled exiting portion of the light rays.

16. A method comprising:
   placing a first optical layer on at least a portion of a first side of a light guide film, wherein a surface of the first optical layer includes a grating pattern; and
   placing a second optical layer on at least a portion of the surface that includes the grating pattern, wherein the grating pattern is configured so that light rays exiting from the light guide film transmit through the grating pattern at least twice before being total internally reflected by the grating pattern.

17. The method of claim 16, further comprising:
placing a non-gas, low-refractive index (LRI) boundary layer on at least a portion of the second optical layer, wherein the refractive index of the LRI boundary layer is less than refractive indices of the light guide film, the first optical layer, and the second optical layer.

18. The method of claim 17, wherein a refractive index of the second optical layer is less than a refractive index of the first optical layer, and wherein a refractive index of the LRI boundary layer is less than refractive indices of the light guide film, the first optical layer, and the second optical layer.

19. The method of claim 16, wherein the grating pattern is configured to out-couple light rays travelling in the light guide film.

20. The method of claim 19, further comprising:
laminating a beam steering structure to at least a portion of a second side of the light guide film, wherein the second side is opposite to the first side, and wherein the beam steering structure comprises:
  a first beam-steering grating pattern configured so that the out-coupled light rays transmit through the first beam-steering grating pattern once before being total internally reflected by the first beam-steering grating pattern; and
  a second beam-steering grating pattern configured so that light rays reflected from the first beam-steering grating pattern transmit through the second beam-steering grating pattern exactly once so as to change a direction of travel of the light rays.

* * * * *